(12) United States Patent
Wang et al.

(10) Patent No.: US 11,126,291 B2
(45) Date of Patent: Sep. 21, 2021

(54) TOUCH DISPLAY PANEL AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Dengyu Wang, Beijing (CN); Benlian Wang, Beijing (CN); Weinan Dai, Beijing (CN); Xucong Wang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/916,260

(22) Filed: Jun. 30, 2020

(65) Prior Publication Data
US 2021/0191550 A1 Jun. 24, 2021

(30) Foreign Application Priority Data
Dec. 20, 2019 (CN) .......................... 201911324778.7

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC .............................. G06F 3/0412; G06F 3/0446
See application file for complete search history.

(56) References Cited

U.S. PATENT DOCUMENTS

| 2010/0259502 | A1* | 10/2010 | Ema ...................... | G06F 3/0445 |
| | | | | 345/174 |
| 2012/0098787 | A1* | 4/2012 | Kim ...................... | G06F 3/0446 |
| | | | | 345/174 |
| 2020/0167037 | A1* | 5/2020 | Lee ........................ | G06F 3/0445 |

* cited by examiner

*Primary Examiner* — Peter D McLoone
(74) *Attorney, Agent, or Firm* — Arent Fox LLP; Michael Fainberg

(57) ABSTRACT

The present disclosure provides a touch display panel and a display device. The touch display panel includes: a base substrate, including a surface; the surface includes a display area and a non-display area, and the non-display area surrounds the display area; the display area includes a plurality of first touch electrodes extending along a first direction; the non-display area includes a plurality of first touch wires correspondingly electrically connected to the plurality of first touch electrodes, and wire lengths of the plurality of first touch wires are different; and at least one of following ways is adopted to make resistance of the respective first touch wires consistent: the different first touch wires have different numbers of first via holes; and the different first touch wires have different wire widths.

10 Claims, 7 Drawing Sheets

F1

TOUCH DISPLAY PANEL AND DISPLAY DEVICE

This application claims priority to Chinese Patent Application No. 201911324778.7, filed Dec. 20, 2019, which is hereby incorporated by reference in its entirety.

FIELD

The present disclosure relates to the field of semiconductors, and in particular to a touch display panel and a display device.

BACKGROUND

Nowadays, due to the rapid development of a display technology level, the use range of touch display screens is getting wider and wider. At present, touch technologies mainly involved in touch display screens are classified into self-capacitance type touch and mutual capacitance type touch.

SUMMARY

The present disclosure provides a touch display panel and a display device.

An embodiment of the present disclosure provides a touch display panel, including: a base substrate including on a surface of the base substrate: a display area and a non-display area surrounding the display area; where the display area includes a plurality of first touch electrodes extending along a first direction; where the non-display area includes a plurality of first touch wires electrically connected to the plurality of first touch electrodes respectively, and wire lengths of different first touch wires are different; where to enable the plurality of first touch wires have the same resistance, the different first touch wires have different numbers of first via holes; and/or the different first touch wires have different wire widths.

In some embodiments, the display area further includes a plurality of second touch electrodes extending along a second direction perpendicular to the first direction, and the plurality of second touch electrodes are insulated from the plurality of first touch electrodes; where the non-display area further includes a plurality of second touch wires electrically connected to the plurality of second touch electrodes respectively, the plurality of second touch wires are insulated from the plurality of first touch wires; wire lengths of different second touch wires are different; where to enable the plurality of the second touch wires have the same resistance: the different second touch wires have different numbers of second via holes; and/or the different second touch wires have different wire widths.

In some embodiments, the number of first via holes of a first touch wire is inversely proportional to the wire length of the first touch wire, and the number of second via holes of a second touch wire is inversely proportional to the wire length of the second touch wire.

In some embodiments, a shape of an orthographic projection of the first via hole on the base substrate is circular, elliptical, square or triangular; and a shape of an orthographic projection of the second via hole on the base substrate is circular, elliptical, square or triangular.

In some embodiments, the wire width of a first touch wire is proportional to the wire length of the first touch wire; and the wire width of a second touch wire is proportional to the wire length of the second touch wire.

In some embodiments, the non-display area is divided into: a first sub-area, a second sub-area, a third sub-area and a fourth sub-area; where the first sub-area binds a touch IC, the second sub-area is away from the first sub-area, the third sub-area connects the first sub-area and the second sub-area, and the fourth sub-area is opposite to the third sub-area; where each of the plurality of first touch wires is electrically connected to a corresponding first touch electrode in the third sub-area and extends from the third sub-area to the first sub-area; where in a third direction pointing from the display area to the third sub-area, the respective first touch wires are sequentially arranged, and the wire lengths of the respective first touch wires are sequentially increased.

In some embodiments, in the third direction, the numbers of the first via holes of the respective first touch wires are sequentially decreased.

In some embodiments, in the third direction, the wire widths of the respective first touch wires are sequentially increased.

In some embodiments, each of the plurality of second touch wires includes a first sub-wire and a second sub-wire; where the first sub-wire and the second sub-wire of a same second touch wire are electrically connected to different ends of a same second touch electrode respectively; where the first sub-wire is electrically connected to one end of the second touch electrode in the second sub-area, and extends to the first sub-area through the fourth sub-area; where in a fourth direction pointing from the display area to the fourth sub-area, respective first sub-wires are sequentially arranged, and the wire lengths of the respective first sub-wires are sequentially increased; where the second sub-wire is electrically connected to the other end of the second touch electrode in the first sub-area; where in a fifth direction pointing from the display area to the first sub-area, respective second sub-wires are sequentially arranged, and the wire lengths of the respective second sub-wires are sequentially increased.

In some embodiments, in the fourth direction, the numbers of the second via holes of the respective first sub-wires are sequentially decreased; and in the fifth direction, the numbers of the second via holes of the respective second sub-wires are sequentially decreased.

In some embodiments, in the fourth direction, the wire widths of the respective first sub-wires are sequentially increased; and in the fifth direction, the wire widths of the respective second sub-wires are sequentially increased.

In some embodiments, the plurality of first touch electrodes are induction electrodes, and the plurality of first touch wires are induction wires; and the plurality of second touch electrodes are drive electrodes, and the plurality of second touch wires are drive wires.

An embodiment of the present disclosure further provides a display device, including the touch display panel provided by any one of the above embodiments of the present disclosure.

DETAILED DESCRIPTION OF THE EMBODIMENTS

Unless otherwise defined, the technical or scientific terms used in the present disclosure shall have the usual meanings understood by a person of ordinary skill in the art to which the present disclosure belongs. The words "first", "second" and the like used in the present disclosure do not indicate any order, quantity or importance, but are only used to distinguish different components. The word "including" or "containing" and the like, means that an element or item preceding the word includes an element or item listed after the word and the equivalent thereof without excluding other elements or objects. The word "connecting" or "coupling" and the like is not restricted to physical or mechanical connection, but may include electrical connection, whether direct or indirect. The words "up", "down", "left", "right" and the like are only used to indicate the relative positional relationship. After the absolute position of the described object changes, the relative positional relationship may also change accordingly.

In order to keep the following descriptions of the embodiments of the present disclosure clear and concise, the present disclosure omits detailed descriptions of known functions and known components.

It should be noted that, for a mutual capacitance type touch panel, an edge wire (the edge wire is divided into drive wire Tx and induction wire Rx) is generally arranged in a non-display area of the touch panel to transmit a signal of a touch IC to a touch electrode in a display area, that is, a touch signal is transmitted from a near touch IC end to a far touch IC end. However, distances between different touch electrodes and touch ICs are different, and the touch electrodes at the near touch IC end correspond to short edge wires, small resistance and strong signals, while the touch electrodes at the far touch IC end correspond to long edge wires, large resistance and weak signals, leading to a difference in signals between the touch electrodes at different positions, thereby leading to a difference in touch performances at different positions of the same touch panel.

Figure 1:
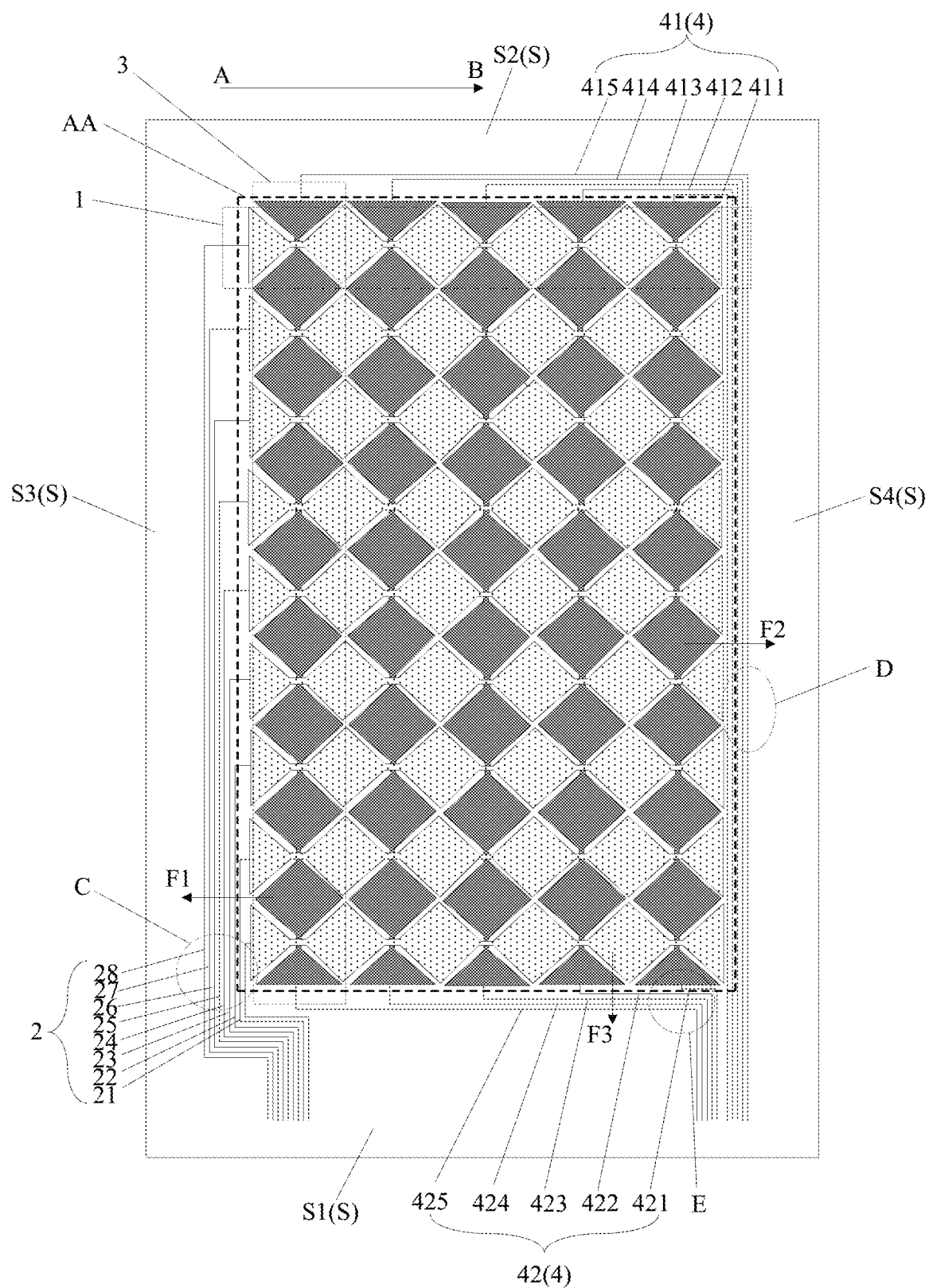
FIG. 1 is a schematic structural diagram of a touch display panel provided by an embodiment of the present disclosure.
Figure 2:
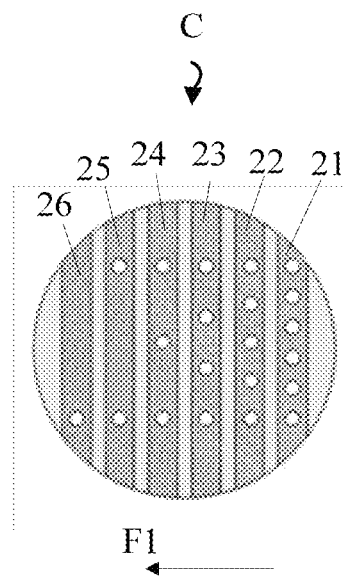
FIG. 2 is a schematic diagram of an enlarged structure at position C in FIG. 1.
Figure 3:
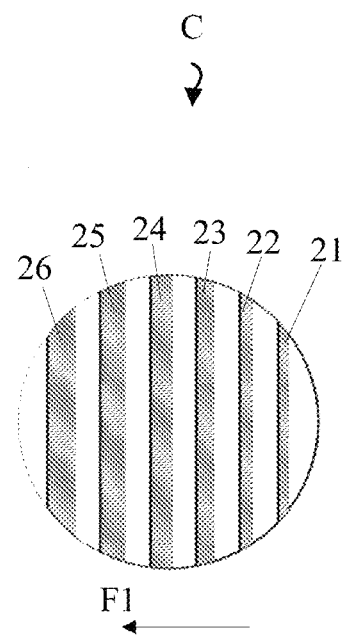
FIG. 3 is another schematic diagram of an enlarged structure at position C in FIG. 1.

Referring to FIG. 1 to FIG. 3, an embodiment of the present disclosure provides a touch display panel. FIG. 2 and FIG. 3 are schematic diagrams of an enlarged structure at position C in FIG. 1. The touch display panel includes: a base substrate including a surface. The surface includes a display area AA and a non-display area S surrounding the display area AA. The display area AA includes a plurality of first touch electrodes 1 (each first touch electrode 1 includes a plurality of diamond-shaped first touch electrode blocks located in the same row) extending along a first direction AB. The non-display area S includes a plurality of first touch wires 2 correspondingly electrically connected to the first touch electrodes 1. Wire lengths of the first touch wires 2 are different.

The different first touch wires 2 adopt at least one of the following ways to make the resistance of the first touch wires 2 consistent: the different first touch wires 2 have different numbers of first via holes as shown in FIG. 2; and the different first touch wires 2 have different wire widths as shown in FIG. 3.

That is, the resistance of the first touch wires 2 may be adjusted only by making the different first touch wires 2 have the different numbers of first via holes; the resistance of the first touch wires 2 may also be adjusted only by making the different first touch wires 2 have the different wire widths. Alternatively, the resistance of the first touch wires 2 may be adjusted both by making the different first touch wires 2 have the different numbers of first via holes and making the different first touch wires 2 have the different wire widths.

According to the touch display panel provided by an embodiment of the present disclosure, the non-display area S includes a plurality of first touch wires 2 correspondingly electrically connected to first touch electrodes 1, wire lengths of the first touch wires 2 are different, and the different first touch wires 2 adopt at least one of the following ways to make the resistance of the first touch wires 2 consistent: the different first touch wires 2 have different numbers of first via holes, and the different first touch wires 2 have different wire widths, where the resistance of the first touch wires 2 can be adjusted by forming the first via holes for the first touch wires 2; the resistance of the first touch wires 2 can also be adjusted by controlling the wire widths of the first touch wires 2, and further the resistance of the different first touch wires 2 can be adjusted accordingly, so that the resistance of the first touch wires 2 with the different wire lengths basically keeps consistent, to avoid the problem that signals obtained by the first touch electrodes 1 are inconsistent due to the inconsistent lengths of the different first touch wires 2 and inconsistent resistance, resulting in inconsistent touch performances at different positions of the touch display panel.

Moreover, when the lengths of the different first touch wires are consistent by means of winding, the touch display panel needs a larger panel border due to winding, which is not conducive to narrowing the border of the touch display panel. A method for improving the touch display panel provided by the embodiments of the present disclosure can also avoid the problem of increasing the width of the border of the touch display panel when adjusting the resistance by winding.

It should be noted that FIG. 2 and FIG. 3 are only schematic diagrams showing part of the first touch wires 2 at position C of FIG. 1. The number of the first via holes of the first touch wires 2 can also be set as more, and the present disclosure is not limited thereto.

Figure 4:
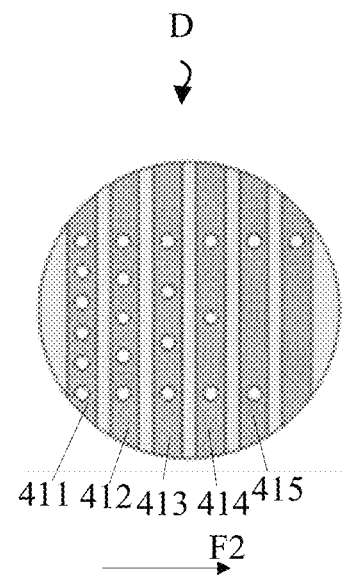
FIG. 4 is a schematic diagram of an enlarged structure at position D in FIG. 1.
Figure 5:
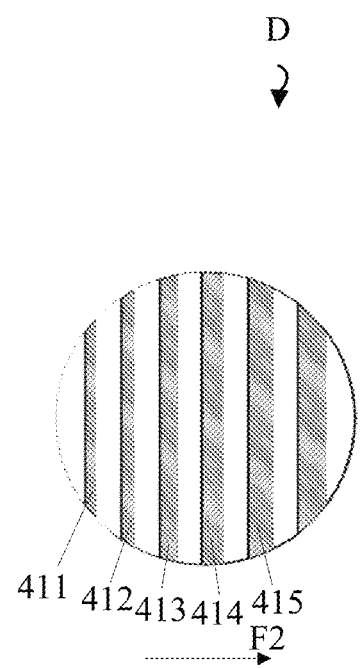
FIG. 5 is another schematic diagram of an enlarged structure at position D in FIG. 1.

In some embodiments, referring to FIG. 1, FIG. 4 and FIG. 5, where FIG. 4 and FIG. 5 are schematic diagrams of an enlarged structure at position D in FIG. 1. The display area AA further includes a plurality of second touch electrodes 3 (each second touch electrode 3 includes a plurality of diamond-shaped second touch electrode blocks located in the same column) extending along a second direction perpendicular to the first direction AB.

The second touch electrodes 3 and the first touch electrodes 1 are insulated from each other.

The non-display area S further includes a plurality of second touch wires 4 correspondingly electrically connected to the second touch electrodes 3. The second touch wires 4 and the first touch wires 2 are insulated from each other.

Wire lengths of the second touch wires 4 are different.

The different second touch wires 4 adopt at least one of the following ways to make the resistance of the second touch wires 4 consistent: the different second touch wires 4 have different numbers of second via holes as shown in FIG. 4; and the different second touch wires 4 have the different wire widths as shown in FIG. 5.

According to the touch display panel provided by an embodiment of the present disclosure, different second touch wires 4 adopt at least one of the following ways to make the resistance of the second touch wires 4 consistent: the different second touch wires 4 have different numbers of second via holes, and the different second touch wires 4 have different wire widths, and further the resistance of different second wires 4 can be adjusted accordingly, so that the resistance of the second touch wires 4 with different wire lengths basically keeps consistent, to avoid the problem that signals obtained by the second touch electrodes 3 are inconsistent due to the inconsistent lengths of the different second touch wires 4 and inconsistent resistance, resulting in inconsistent touch performances at different positions of the touch display panel.

It should be noted that, in some embodiments, the second touch electrodes 3 may have an integral structure including a plurality of diamond-shaped second touch electrode blocks, and a plurality of first touch electrode blocks of the first touch electrodes 1 may be electrically connected by a bridge at positions crossing the second touch electrodes 3.

In some embodiments, an insulating part may be further disposed at a crossing position between the first touch electrodes 1 and the second touch electrodes 3, so as to prevent conduction at the crossing position between the first touch electrodes 1 and the second touch electrodes 3.

In some embodiments, referring to FIG. 1 and FIG. 2, the number of the first via holes of first touch wires 2 is inversely proportional to the wire lengths; and referring to FIG. 1 and FIG. 4, the number of the second via holes of second touch wires 4 is inversely proportional to the wire lengths.

In some embodiments, the number of the first via holes of the first touch wires 2 are inversely proportional to the wire lengths, and the number of the second via holes of the second touch wires 4 is inversely proportional to the wire lengths, that is, the longer the first touch wires 2, the smaller the number of the first via holes formed thereon, and the shorter the first touch wires 2, the larger the number of the first via holes formed thereon, thereby keeping the resistance of the first touch wires 2 with the different lengths consistent. Similarly, the longer the second touch wires 4, the smaller the number of the second via holes formed thereon, and the shorter the second touch wires 4, the larger the number of second via holes formed thereon, thereby keeping the resistance of the second touch wires 4 with the different lengths consistent.

Figure 6:
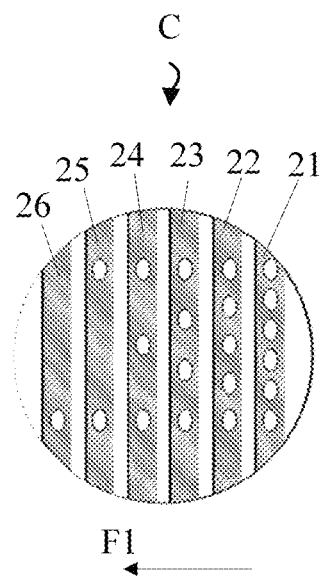
FIG. 6 is a schematic diagram of an enlarged structure at position C in FIG. 1, when first via holes are elliptical.
Figure 7:
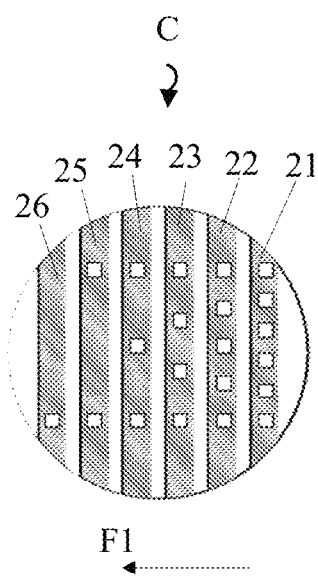
FIG. 7 is a schematic diagram of an enlarged structure at position C in FIG. 1 when the first via holes are square.
Figure 8:
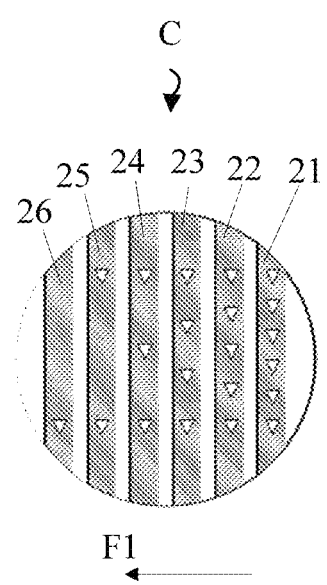
FIG. 8 is a schematic diagram of an enlarged structure at position C in FIG. 1 when the first via holes are triangular.

In some embodiments, referring to FIG. 2. FIG. 6, FIG. 7 and FIG. 8, an orthographic shape of the first via holes on the base substrate may be circular, elliptical, square or triangular; an orthographic shape of the second via holes on the base substrate is circular, elliptical, square or triangular.

In some embodiments, the first via holes in the different first touch wires 2 may be disposed at approximately one position of the non-display area S, for example, they may be all disposed at a lower end position C of the non-display area S on the left side of the display area AA in FIG. 1, to facilitate unified fabrication of the first via holes and simplify the process. Similarly, the second via holes in the different second touch wires 4 may be disposed at another position in the non-display ara S, so as to facilitate unified fabrication of the second via holes. Of course, if the manufacturing difficulty is not considered, the positions of the first via holes of the different first touch wires 2 can also be respectively set at different positions of the non-display area, for example, the first via holes of the outermost first touch wire 2 may be formed in an upper part of the non-display area S on the left side of the display area AA in FIG. 1, and the first via holes of the innermost first touch wire 2 may be formed in a lower part of the non-display area S on the left side of the display ara AA in FIG. 1.

Figure 9:
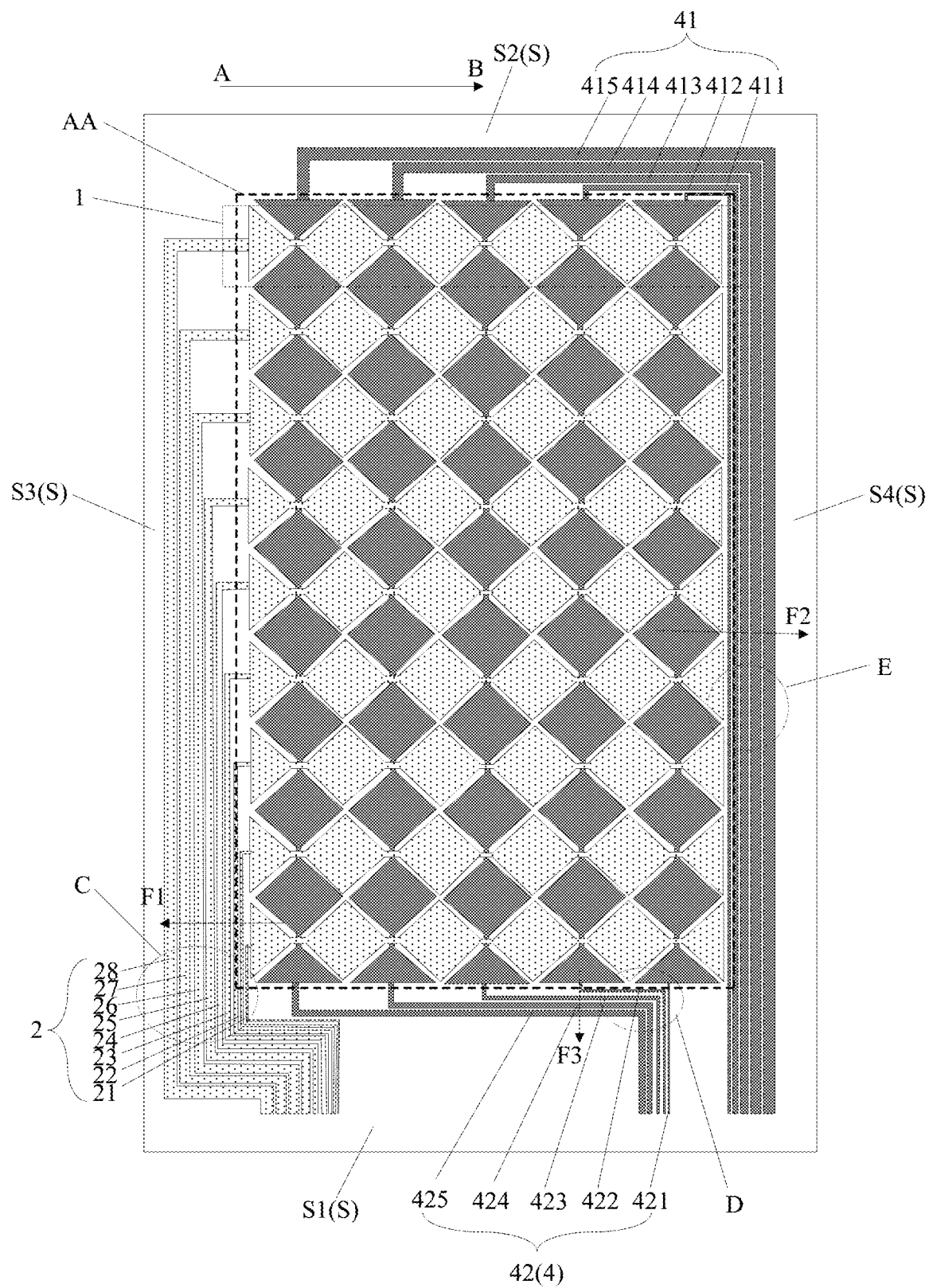
FIG. 9 is a schematic structural diagram of a specific touch display panel provided by an embodiment of the present disclosure.

In some embodiments, referring to FIG. 3 or FIG. 9, the wire widths of the first touch wires 2 are proportional to the wire lengths; and referring to FIG. 5 or FIG. 9, the wire widths of the second touch wires 4 are proportional to the wire lengths. In an embodiment of the present disclosure, the wire widths of the first touch wires 2 are proportional to the wire lengths, and the wire widths of the second touch wires 4 are proportional to the wire lengths, that is, the longer the wire lengths of the first touch wires 2, the wider the wire widths of the first touch wires 2, and the shorter the wire lengths of the first touch wires 2, the narrower the wire widths of the first touch wires 2, thereby keeping the resistance of the first touch wires 2 with the different lengths consistent. Similarly, the longer the wire lengths of the second touch wires 4, the wider the wire widths of the second touch wires 4, and the shorter the wire lengths of the second touch wires 4, the narrower the wire widths of the second touch wires 4, thereby keeping the resistance of the second touch wires 4 with the different lengths consistent.

In some embodiments, referring to FIG. 1 or FIG. 9, the non-display area S includes: a first sub-area S1 (e.g., an area located below the display area AA in FIG. 1) for binding to a touch IC, a second sub-area S2 (e.g., an area located above the display area AA in FIG. 1) located on the non-display area S away from the first sub-area S1, a third sub-area S3 (e.g., an area located on the left side of the display area AA in FIG. 1) connecting the first sub-area S1 and the second sub-area S2, and a fourth sub-area S4 (e.g., an area located on the right side of the display area AA in FIG. 1) opposite to the third sub-area S3.

Each of the plurality of first touch wires 2 is electrically connected to a corresponding first touch electrode 1 in the third sub-area S3 and extends from the third sub-area S3 to the first sub-area S.

In a third direction (as indicated by arrow F1 in FIG. 1) pointing from the display area AA to the third sub-area S3, the first touch wires 2 are sequentially arranged, and the wire lengths are sequentially increased.

That is, referring to FIG. 1, in the third direction pointing from the display area AA to the third sub-area S3, a first first touch wire 21, a second first touch wire 22, a third first touch wire 23, a fourth first touch wire 24, a fifth first touch wire 25, a sixth first touch wire 26, a seventh first touch wire 27, and an eighth first touch wire 28 are sequentially disposed.

The first first touch wire 21, the second first touch wire 22, the third first touch wire 23, the fourth first touch wire 24, the fifth first touch wire 25, the sixth first touch wire 26, the seventh first touch wire 27, and the eighth first touch wire 28 have sequentially increased wire lengths.

It should be noted that the wire length of each first touch wire 2 may refer to an overall length of each first touch wire 2. i.e., an extending length from a connection end electrically connected to the first touch electrode 1 to the other end of the touch display panel for electrical connection to the touch IC.

In some embodiments, referring to FIG. 1 and FIG. 2, in the third direction (as indicated by arrow F1 in FIG. 1) pointing from the display area AA to the third sub-area S3, the number of the first via holes of each of the first touch wires 2 is sequentially decreased.

In some embodiments, in the third direction pointing from the display area AA to the third sub-area S3, the first touch wires 2 are sequentially arranged, and the wire lengths are sequentially increased.

Therefore, the number of the first via holes of each of the first touch wires 2 is sequentially decreased, thereby ensuring that the resistance of the first touch wires 2 remains consistent.

In some embodiments, referring to FIG. 9, in the third direction (as indicated by arrow F1 in FIG. 1) pointing from the display area AA to the third sub-area S3, the wire width of each of the first touch wires 2 is sequentially increased.

In an embodiment of the present disclosure, in the direction pointing from the display area AA to the third sub-area S3, the first touch wires 2 are sequentially arranged, and the wire lengths are sequentially increased. Therefore, the wire width of each of the first touch wires 2 is sequentially increased, thereby ensuring that the resistance of the first touch wires 2 remains consistent.

In some embodiments, referring to FIG. 1 or FIG. 9, each of the second touch wires 4 includes a first sub-wire 41 and a second sub-wire 42.

The first sub-wire 41 and the second sub-wire 42 of the same second touch wire 4 are electrically connected to different ends of the same second touch electrode 4 respectively, that is, for example, the first second touch electrode 3 from the left has an upper end electrically connected to a fifth first sub-wire 415 and a lower end electrically connected to a fifth second sub-wire 425; the fifth first sub-wire 415 and the fifth second sub-wire 425 corresponding to the second touch electrode 3 serve as a second touch wire 4; each first sub-wire 41 is electrically connected to one end of the second touch electrode 3 in the second sub-area S2, and extends to the first sub-area S1 through the fourth sub-area S4.

In the fourth direction (as indicated by arrow F2 in the figure) pointing from the display area AA to the fourth sub-area S4, the first sub-wires 41 are sequentially arranged, and the wire lengths are sequentially increased. That is, in the fourth direction (as indicated by arrow F2 in FIG. 1) pointing from the display area AA to the fourth sub-area S4, a first first sub-wire 411, a second first sub-wire 412, a third first sub-wire 413, a fourth first sub-wire 414 and a fifth first sub-wire 415 are sequentially distributed, where the first first sub-wire 411, the second first sub-wire 412, the third first sub-wire 413, the fourth first sub-wire 414, and the fifth first sub-wire 415 have sequentially increased wire lengths, that is, the farther away from the display area AA, the longer the wire length of the first sub-wire 41.

The second sub-wire 42 is electrically connected to the other end of the second touch electrode 3 in the first sub-area S1, that is, the second sub-wire 42 is only distributed in the first sub-area S1.

In the fifth direction (as indicated by arrow F3 in FIG. 1) pointing from the display area AA to the first sub-area S1, the second sub-wires 42 are sequentially arranged and the wire lengths are sequentially increased, that is, in the direction pointing from the display area AA to the first sub-area S1, a first second sub-wire 421, a second second sub-wire 422, a third second sub-wire 423, a fourth second sub-wire 424 and a fifth second sub-wire 425 are sequentially distributed, where the first second sub-wire 421, the second second sub-wire 422, the third second sub-wire 423, the fourth second sub-wire 424 and the fifth second sub-wire 425 have sequentially increased wire lengths.

In some embodiments, referring to FIG. 1 and FIG. 4, in the fourth direction (as indicated by arrow F2) pointing from the display area AA to the fourth sub-area S4, the number of the second via holes of each of the first sub-wires 41 is sequentially decreased, that is, the number of second via holes of the first first sub-wire 411, the second first sub-wire 412, the third first sub-wire 413, the fourth first sub-wire 414 and the fifth first sub-wire 415 is sequentially decreased.

Figure 10:
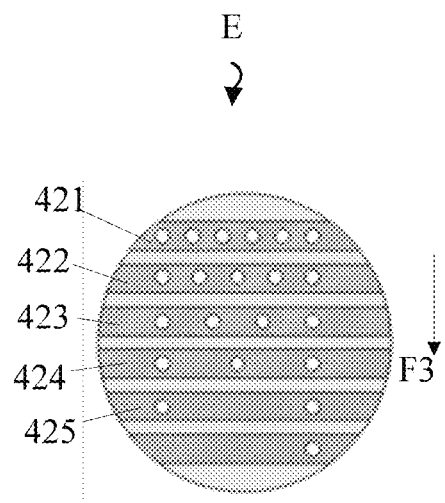
FIG. 10 is a schematic diagram of an enlarged structure at position E in FIG. 1.

Referring to FIG. 1 and FIG. 10, where FIG. 10 is a schematic diagram of an enlarged structure at position E in FIG. 1, in the fifth direction (as indicated by arrow F3) pointing from the display area AA to the first sub-area S1, the number of the second via holes of each of the second sub-wires 42 is sequentially decreased, that is, the number of the second via holes of the first second sub-wire 421, the second second sub-wire 422, the third second sub-wire 423, the fourth second sub-wire 424 and the fifth second sub-wire 425 is sequentially decreased.

In some embodiments, in the fourth direction pointing from the display area AA to the fourth sub-area S4, the first sub-wires 41 are sequentially arranged and the wire lengths are sequentially increased. Therefore, the number of the second via holes of each of the first sub-wires 41 is sequentially decreased, to basically keep the resistance of the first sub-wires 41 consistent. Similarly, in the direction pointing from the display area AA to the first sub-area S, the second sub-wires 42 are sequentially arranged, and the wire lengths are sequentially increased. Therefore, the number of the second via holes of each of the second sub-wires 42 is sequentially decreased, to basically keep the resistance of the second sub-wires 42 consistent.

Figure 11:
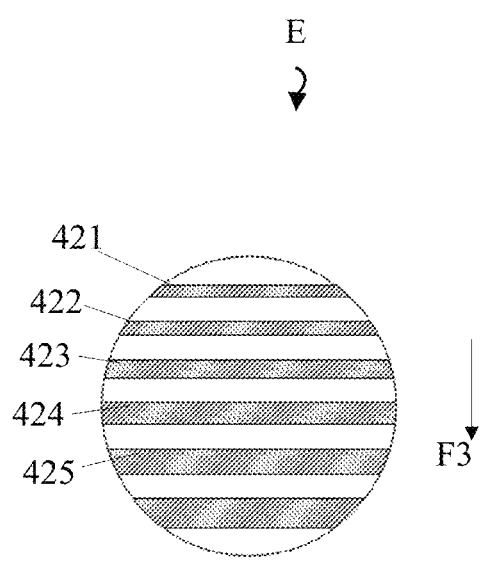
FIG. 11 is another schematic diagram of an enlarged structure at position E in FIG. 1.

In some embodiments, referring to FIG. 5 or FIG. 9, in the fourth direction (as indicated by arrow F2) pointing from the display area AA to the fourth sub-area S4, the wire width of each of the first sub-wires 41 is sequentially increased. Referring to FIG. 1 and FIG. 11, FIG. 11 is a schematic diagram of an enlarged structure at position E in FIG. 1.

In the fifth direction (as indicated by arrow F3) pointing from the display area AA to the first sub-area S, the wire width of each of the second sub-wires 42 is sequentially increased.

In some embodiments, in the fourth direction pointing from the display area AA to the fourth sub-area S4, the first sub-wires 41 are sequentially arranged and the wire lengths are sequentially increased. Therefore, the wire width of each of the first sub-wires 41 is sequentially increased, to basically keep the resistance of the first sub-wires 41 consistent.

Similarly, in the fifth direction pointing from the display area AA to the first sub-area S1, the second sub-wires 42 are sequentially arranged and the wire lengths are sequentially increased. Therefore, the wire width of each of the second sub-wires 42 is sequentially decreased, to basically keep the resistance of the second sub-wires 42 consistent.

In some embodiments, the first touch electrodes 1 are induction electrodes, and the first touch wires 2 are induction wires; the second touch electrodes 3 are drive electrodes, and the second touch wires 4 are drive wires.

In some embodiments, the first touch electrodes 1 may also be drive electrodes, and the first touch wires 2 may also be drive wires; and the second touch electrodes 3 may also be induction electrodes, and the second touch wires 4 may also be induction wires.

An embodiment of the present disclosure further provides a display device, including the touch display panel provided by the embodiment of the present disclosure. In some embodiments, the display device may further include a touch IC for providing a signal for the touch display panel.

The beneficial effects of the embodiments of the present disclosure are as follows: according to the touch display panel provided by the embodiments of the present disclosure, the non-display area has a plurality of first touch wires correspondingly electrically connected to first touch electrodes, wire lengths of the first touch wires are different, and the different first touch wires adopt at least one of the following ways to make the resistance of the first touch wires consistent: the different first touch wires have different numbers of first via holes; and the different first touch wires have different wire widths, where the resistance of the first touch wires can be adjusted by forming first via holes for the first touch wires; the resistance of the first touch wires can also be adjusted by controlling the wire widths of the first touch wires, and further the resistance of the different first touch wires can be adjusted accordingly, so that the resistance of the first touch wires with the different wire lengths basically keeps consistent, to avoid the problem that signals obtained by the first touch electrodes are inconsistent due to the inconsistent lengths of the different first touch wires and inconsistent resistance, resulting in the inconsistent touch performances at the different positions of the touch display panel. Moreover, when the lengths of the different first touch wires are consistent by means of winding, the touch display panel needs a larger panel border due to winding, which is not conducive to narrowing the border of the touch display panel. A method for improving the touch display panel provided by the embodiments of the present disclosure can also avoid the problem of increasing the width of the border of the touch display panel when adjusting the resistance by winding.

Obviously, a person skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:
1. A touch display panel, comprising:
a base substrate comprising on a surface of the base substrate:
a display area; and
a non-display area surrounding the display area;
wherein the display area comprises a plurality of first touch electrodes extending along a first direction;
the non-display area comprises a plurality of first touch wires electrically connected to the plurality of first touch electrodes respectively, and wire lengths of different first touch wires are different; and
wherein to enable the plurality of first touch wires have the same resistance,
the different first touch wires have different numbers of first via holes, and the number of first via holes of a first touch wire is inversely proportional to the wire length of the first touch wire.
2. The touch display panel according to claim 1,
wherein the display area further comprises a plurality of second touch electrodes extending along a second direction perpendicular to the first direction, and the plurality of second touch electrodes are insulated from the plurality of first touch electrodes;
wherein the non-display area further comprises a plurality of second touch wires electrically connected to the plurality of second touch electrodes respectively, the plurality of second touch wires are insulated from the plurality of first touch wires; and wire lengths of different second touch wires are different; and
wherein to enable the plurality of the second touch wires have the same resistance,
the different second touch wires have different numbers of second via holes.
3. The touch display panel according to claim 2, wherein the number of second via holes of a second touch wire is inversely proportional to the wire length of the second touch wire.
4. The touch display panel according to claim 3, wherein a shape of an orthographic projection of the first via hole on the base substrate is circular, elliptical, square or triangular; and a shape of an orthographic projection of the second via hole on the base substrate is circular, elliptical, square or triangular.
5. The touch display panel according to claim 2, wherein the non-display area is divided into: a first sub-area, a second sub-area, a third sub-area and a fourth sub-area;
wherein the first sub-area binds a touch IC, the second sub-area is away from the first sub-area, the third sub-area connects the first sub-area and the second sub-area, and the fourth sub-area is opposite to the third sub-area;
wherein each of the plurality of first touch wires is electrically connected to a corresponding first touch electrode in the third sub-area and extends from the third sub-area to the first sub-area;
wherein in a third direction pointing from the display area to the third sub-area, the respective first touch wires are sequentially arranged, and the wire lengths of the respective first touch wires are sequentially increased.
6. The touch display panel according to claim 5, wherein in the third direction, the numbers of the first via holes of the respective first touch wires are sequentially decreased.
7. The touch display panel according to claim 5, wherein each of the plurality of second touch wires comprises a first sub-wire and a second sub-wire;
wherein the first sub-wire and the second sub-wire of a same second touch wire are electrically connected to different ends of a same second touch electrode respectively;
wherein the first sub-wire is electrically connected to one end of the second touch electrode in the second sub-area, and extends to the first sub-area through the fourth sub-area;
wherein in a fourth direction pointing from the display area to the fourth sub-area, respective first sub-wires are sequentially arranged, and the wire lengths of the respective first sub-wires are sequentially increased;
wherein the second sub-wire is electrically connected to the other end of the second touch electrode in the first sub-area;
wherein in a fifth direction pointing from the display area to the second sub-area, respective second sub-wires are sequentially arranged, and the wire lengths of the respective second sub-wires are sequentially increased.
8. The touch display panel according to claim 7, wherein in the fourth direction, the numbers of the second via holes of the respective first sub-wires are sequentially decreased; and in the fifth direction, the numbers of the second via holes of the respective second sub-wires are sequentially decreased.

9. The touch display panel according to claim 2, wherein the first touch electrode is an induction electrode, and the first touch wire is an induction wires; and the second touch electrode is a drive electrode, and the second touch wire is a drive wire.

10. A display device, comprising a touch display panel, wherein the touch display panel comprises:

a base substrate comprising on a surface of the base substrate:
  a display area; and
  a non-display area surrounding the display area;
  wherein the display area comprises a plurality of first touch electrodes extending along a first direction;
    the non-display area comprises a plurality of first touch wires electrically connected to the plurality of first touch electrodes respectively, and wire lengths of different first touch wires are different; and
  wherein to enable the plurality of first touch wires have the same resistance,
  the different first touch wires have different numbers of first via holes, and the number of first via holes of a first touch wire is inversely proportional to the wire length of the first touch wire.

\* \* \* \* \*